(12) United States Patent
Agee

(10) Patent No.: US 10,836,634 B1
(45) Date of Patent: Nov. 17, 2020

(54) INTEGRATED GTL PROCESS

(71) Applicant: Emerging Fuels Technology, Inc., Tulsa, OK (US)

(72) Inventor: Kenneth L. Agee, Tulsa, OK (US)

(73) Assignee: EMERGING FUELS TECHNOLOGY, INC., Tulsa, OK (US)

(*) Notice: Subject to any disclaimer, the term of this patent is extended or adjusted under 35 U.S.C. 154(b) by 83 days.

(21) Appl. No.: 16/360,857

(22) Filed: Mar. 21, 2019

(51) Int. Cl.
*C07C 1/04* (2006.01)
*C07C 27/06* (2006.01)
*C01B 3/34* (2006.01)
*C10G 2/00* (2006.01)

(52) U.S. Cl.
CPC .............. *C01B 3/34* (2013.01); *C10G 2/30* (2013.01); *C01B 2203/0205* (2013.01); *C01B 2203/0475* (2013.01); *C01B 2203/062* (2013.01); *C01B 2203/0827* (2013.01); *C01B 2203/142* (2013.01); *C01B 2203/148* (2013.01); *C10G 2300/1025* (2013.01)

(58) Field of Classification Search
CPC ... C10G 2/30; C10G 2/32; C10G 2/00; C10G 2300/1022; C10G 2400/20; C01B 2203/062; C01B 2203/0883
See application file for complete search history.

(56) References Cited

U.S. PATENT DOCUMENTS

| | | |
|---|---|---|
| 5,177,114 A | 1/1993 | Van Dijk et al. |
| 5,245,110 A | 9/1993 | Van Dijk et al. |
| 5,942,203 A | 8/1999 | Van Dijk et al. |
| 6,085,512 A | 7/2000 | Agee et al. |
| 6,130,259 A | 10/2000 | Waycuilis |
| 6,155,039 A | 12/2000 | Agee et al. |
| 6,172,124 B1 | 1/2001 | Wolflick et al. |
| 6,265,453 B1 | 7/2001 | Kennedy |
| 6,277,894 B1 | 8/2001 | Agee et al. |
| 6,345,493 B1 | 2/2002 | Smith et al. |
| 6,669,744 B2 | 12/2003 | Allam et al. |
| 6,673,845 B2 | 1/2004 | Price |
| 6,915,661 B2 | 7/2005 | Le Bot |
| 6,989,135 B2 | 1/2006 | Kennedy |
| 2002/0115731 A1* | 8/2002 | Price ................ F01K 23/064 518/703 |
| 2002/0155061 A1* | 10/2002 | Prasad ................ C01B 3/382 423/652 |
| 2003/0119919 A1* | 6/2003 | Allam ................ C01B 3/38 518/704 |

(Continued)

*Primary Examiner* — Imran Akram
(74) *Attorney, Agent, or Firm* — Head, Johnson, Kachigian & Wilkinson, PC

(57) ABSTRACT

An integrated process for converting light hydrocarbon gases into products. Pre-packaged equipment such as a gas turbine and process compressors may be used to efficiently integrate the process. The gas turbine may provide a portion of the oxygen required in the process as compressed air. An additional oxygen rich stream may be provided by a separate air separation process so that the combined air and oxygen rich streams have an oxygen content of 25% to 50%. The gas turbine may also provide thermal energy to pre-heat the oxygen rich stream and feed gas stream and power to run compressors, air separation, and auxiliaries in the process.

19 Claims, 1 Drawing Sheet

(56) References Cited

U.S. PATENT DOCUMENTS

| | | | | |
|---|---|---|---|---|
| 2004/0089021 A1* | 5/2004 | Le Bot | .................. | F25J 1/0216 |
| | | | | 62/611 |
| 2005/0080146 A1* | 4/2005 | Abbott | .................... | C10G 2/32 |
| | | | | 518/703 |
| 2005/0201929 A1* | 9/2005 | Hershkowitz | ............ | C01B 3/56 |
| | | | | 423/652 |
| 2006/0057060 A1* | 3/2006 | Sun | ........................ | C01B 3/501 |
| | | | | 423/651 |
| 2006/0070383 A1* | 4/2006 | Drnevich | ............. | F01K 23/068 |
| | | | | 60/775 |
| 2006/0123844 A1* | 6/2006 | Le Bot | ................ | F25J 3/04018 |
| | | | | 62/649 |
| 2007/0256361 A1* | 11/2007 | Kindig | ...................... | C10J 3/57 |
| | | | | 48/197 R |
| 2010/0022668 A1* | 1/2010 | Allam | .................. | C07C 1/0425 |
| | | | | 518/703 |
| 2015/0073188 A1* | 3/2015 | Floudas | ............... | C07C 5/2767 |
| | | | | 585/332 |
| 2019/0284484 A1* | 9/2019 | Van Willigenburg | .... | F02C 6/18 |

\* cited by examiner

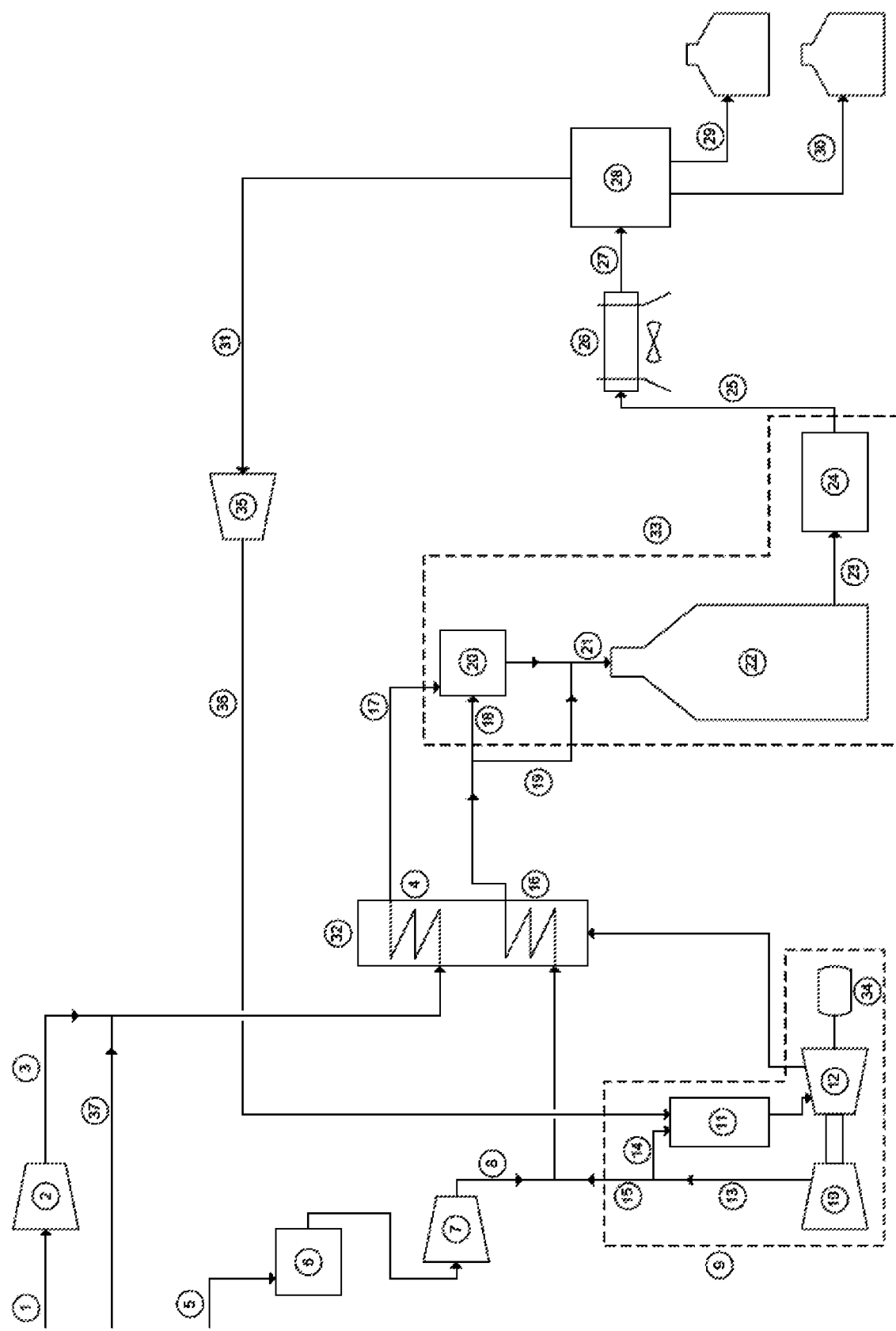

INTEGRATED GTL PROCESS

BACKGROUND OF THE INVENTION

Field of Invention

The present invention relates to an integrated gas to liquids process for the production of heavy hydrocarbon products from light gaseous hydrocarbons such as natural gas, associated gas, coal seam gas, landfill gas, or biogas.

Background

Various processes are known for the conversion of light hydrocarbon-containing gases into normally liquid products, such as methanol, higher alcohols, and hydrocarbon fuels and chemicals, particularly paraffinic hydrocarbons. Such processes are directed at the objective of adding value to the feedstock by making a transportable, more valuable product such as diesel fuel, jet fuel, or chemicals such as base oils, solvents, or drilling fluids.

The Fischer-Tropsch process can be used to convert such light hydrocarbon gases into more valuable, easily transportable liquid hydrocarbon products and chemicals. The feedstock is first converted to synthesis gas comprising carbon monoxide and hydrogen. The synthesis gas is then converted to heavy hydrocarbon products over a Fischer-Tropsch catalyst. The heavy hydrocarbon products can be subjected to further workup or processing by hydroprocessing such as hydrocracking and/or hydroisomerization and distillation, resulting in, for example, a high yield of high-quality middle distillate products such as jet fuel or diesel fuel. The heavy hydrocarbon products can thereafter also be upgraded to specialty products such as solvents, drilling fluids, waxes, or lube base oils due to the high purity of the Fischer-Tropsch products.

Processes that convert light hydrocarbons to heavier hydrocarbon products generally have at least three steps: 1) conversion of the feedstock to synthesis gas comprising carbon monoxide and hydrogen; 2) conversion of the synthesis gas to heavy hydrocarbons via a Fischer-Tropsch reaction; and 3) hydroprocessing the heavy hydrocarbon product to produce one or more finished hydrocarbon products.

The efficiency and effectiveness of the subject process depends not only on the effectiveness of the three steps, but also on how the steps are integrated.

Based on the foregoing, it is desirable to provide an integrated gas to liquids process to efficiently and economically produce heavy hydrocarbon products from light gaseous hydrocarbons.

It is further desirable for such a process to eliminate the need for a fired heater by utilizing gas turbine exhaust heat.

SUMMARY OF THE INVENTION

In general, in a first aspect, the invention relates to a process for converting a light hydrocarbon gas feed stream into heavy hydrocarbon products, which process comprises: A) extracting compressed air from a compressor section of a gas turbine; B) separating ambient air into an oxygen-rich stream and a nitrogen-rich stream; C) compressing and combining the oxygen-rich stream with the compressed air extracted from the compressor section of the gas turbine to produce a combined oxygen stream, such that the combined oxygen stream comprises between 25% and 50% by volume oxygen; D) pre-heating the combined oxygen stream to between 400 F and 1,100 F by exchange with exhaust gases from the gas turbine to produce a pre-heated combined oxygen stream; E) providing the light hydrocarbon gas feed stream at a pressure substantially equivalent to the pressure of the pre-heated combined oxygen stream, where the light hydrocarbon gas feed stream is preheated to between 400 F and 1,100 F by exchange with exhaust gases from the gas turbine; F) converting the pre-heated combined oxygen stream and the light hydrocarbon gas feed stream to synthesis gas in a synthesis gas generation unit; G) converting the synthesis gas of step F to hydrocarbon products in a synthesis reactor; H) condensing and separating the hydrocarbon products of step G; and I) using tail gas from the synthesis reactor as fuel in a combustor of the gas turbine.

The light hydrocarbon gas feed stream may comprise natural gas, associated gas, coal seam gas, landfill gas, biogas, or a combination thereof. The hydrocarbon products may comprise methanol, higher alcohols, Fischer Tropsch products, or a combination thereof. Separating ambient air in step B may be accomplished by membrane separation, pressure swing adsorption, vacuum pressure swing adsorption, or cryogenic liquefaction and separation.

The compressed air and the oxygen-rich stream may be compressed in step C to a pressure high enough that, after pressure losses through the synthesis gas generation unit and the synthesis reactor, the tail gas has a pressure high enough to flow into the combustor section of the gas turbine. The compressed air and the oxygen-rich stream may be compressed separately or together in a single compressor.

The synthesis gas generation unit may be operated at a pressure below the pressure of air extraction from the compressor section of the gas turbine and the tail gas is compressed to a pressure required to flow into the combustor of the gas turbine. The synthesis gas generation unit may comprise a partial oxidation reactor, an autothermal reformer reactor, or a combination thereof. The partial oxidation reactor may be catalytic or non-catalytic.

The gas turbine may drive a power generator. The power generator may provide substantially all of the power required to drive the process. The tail gas may provide substantially all energy required to drive the gas turbine. The gas turbine may use a catalytic element or a trapped vortex element in the combustor to burn a low btu tail gas. Any excess tail gas above what is required to operate the gas turbine may be combusted in a duct burner in an exhaust of the gas turbine. The process may further comprise adding a small amount of supplemental fuel to the tail gas if the tail gas is not adequate to operate the gas turbine at full power.

The synthesis reactor may produce synthesized water, and the process may further comprise using the synthesized water for water flood or fracking purposes or vaporizing the synthesized water in an exhaust of the gas turbine. The process may further comprise stripping the synthesized water to remove trace organics such as alcohols and organic acids before vaporizing the synthesized water in the exhaust of the gas turbine. Light hydrocarbon feed gas may be used to strip trace organics from the synthesized water.

The process may further comprise pre-heating a feed stream to a hydroprocessing unit by exchange with an exhaust of the gas turbine, the feed stream comprising the hydrocarbon products, and further hydroprocessing the heavy products.

BRIEF DESCRIPTION OF THE DRAWINGS

FIG. 1 illustrates a simple process diagram according to the present invention.

DETAILED DESCRIPTION OF THE INVENTION

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for the purposes of example.

In general, in a first aspect, the invention relates to the use of pre-packaged systems including compressors, air separation units, and a gas turbine to efficiently and economically process the light hydrocarbon gases to produce heavy hydrocarbon products. Specifically, a gas turbine comprising an air compressor, combustor, and an expansion turbine may be used to provide a slipstream of air extracted from the compressor section of the gas turbine at elevated pressure to provide a portion of the oxygen needed to produce synthesis gas in a synthesis gas generation unit.

The synthesis gas generation unit may comprise any type of reactor known to one skilled in the art to make synthesis gas. A preferred system may combine partial oxidation and autothermal reforming, specifically catalytic partial oxidation and autothermal reforming. In addition to the oxygen provided in the air extracted from the gas turbine compressor section, an oxygen rich stream may be separated from ambient air in an air separation unit and co-fed to the synthesis gas generation unit. The air separation unit may be any type known to those skilled in the art, including membrane separation, pressure swing adsorption (PSA), vacuum pressure swing adsorption (VPSA), or cryogenic separation, preferably VPSA.

The air from the compressor section of the gas turbine may be further compressed if needed to the appropriate pressure required by the synthesis gas generation unit. The air separation unit may produce a nitrogen rich stream and an oxygen rich stream. The oxygen rich stream from the air separation unit may also be compressed to the pressure required by the synthesis gas generation unit. The oxygen containing streams may be compressed separately or in the same compressor. If, for example, the air from the gas turbine compressor is at 150 psig and the synthesis gas generation unit is designed to operate at 300 psig, the oxygen rich stream from the air separation unit could be compressed to 150 psig and combined with the air stream and then the combined stream could be compressed to 300 psig in a single compressor. Alternatively, the compressed air extracted from the gas turbine could be further compressed in a separate compressor to 300 psig and the oxygen rich stream from the air separation unit could be compressed to 300 psig in a separate compressor and then the air and the oxygen rich stream could be combined. If the air separation unit is a cryogenic process, the oxygen rich stream may be pumped to the required pressure and then vaporized.

The combined oxygen containing streams may preferably comprise between 25% and 50% by volume oxygen. At low oxygen concentrations, such as when using only air, which is 21% oxygen, the pre-heat temperature required to get desirable conversion efficiencies in the synthesis gas generation unit may be too high and the amount of air required to provide the needed oxygen may be more than can be extracted from the gas turbine, in which case additional air may be compressed from ambient pressure. At high oxygen concentrations, above 50% for example, the size and cost of the air separation system may become too high and the benefit of the gas turbine integration may diminish. In the present invention, the oxygen concentration may be increased to the target range (25% to 50%) by providing a separate ambient source of oxygen not extracted from the gas turbine which is subjected to enrichment via membrane separation, PSA, VPSA, or cryogenic separation. VPSA may be preferred.

The oxygen rich stream may also need to be compressed, but may require much less power than compression of air and the combined stream with oxygen concentration in the target range of 25% to 50% may reduce the required pre-heat temperature of the oxygen stream and gas stream (for efficient synthesis gas generation) to a level that can be accomplished by heat exchange with the hot exhaust of the gas turbine.

Preferably, the air separation unit may be sized to get the maximum benefit of low-cost air extracted from the gas turbine, with high enough oxygen concentration to reduce the combined oxygen and feed gas pre-heat requirements to the level that can be reached by heat exchange with the gas turbine exhaust. A particularly preferred concentration of the combined oxygen containing stream may be 30% to 40%.

Light hydrocarbon gas, such as natural gas, may also be compressed to a pressure required by the synthesis gas generation unit. The light hydrocarbon gas and oxygen streams may be reacted in the synthesis gas generation unit to produce synthesis gas comprising carbon monoxide and hydrogen. Steam may also be added to the synthesis gas generation unit as needed to prevent soot production and to adjust the H2:CO ratio. Preferably, steam may be used very sparingly in the process, such as less that 1:1 steam to carbon, or less than 0.75:1 steam to carbon, or more preferably less than 0.5:1 steam to carbon.

Steam may be available from the waste heat boiler of the ATR at sufficient pressure to be used in the process and therefore it may not be necessary to use the high temperature gas turbine exhaust to make steam. The high temperature gas turbine exhaust may be used in the process of the present invention primarily for high temperature heating requirements, such as preheating the feed streams to the synthesis gas generation unit. It may also be used to preheat feed to a downstream hydrocracker or hydroprocessing unit. This is a small energy need but at high temperature, which normally requires a fired heater. Eliminating the need for a fired heater by utilizing the gas turbine exhaust heat is another objective of the present invention.

The synthesis gas produced in the synthesis gas generation unit may be reacted in a synthesis reactor such as a Fischer Tropsch reactor to produce heavy hydrocarbon products. This synthesis step could also comprise a methanol reactor or higher alcohol synthesis reactor. For discussion herein, a Fischer Tropsch reactor and catalyst may be used for the hydrocarbon synthesis step. The output of the Fischer Tropsch reactor may include heavy hydrocarbon products, water, and tail gas, which is the light non-condensable (at ambient temperature) gases.

The heavy hydrocarbon products and water may be condensed and removed and the tail gas comprising un-reacted synthesis gas (carbon monoxide and hydrogen), light hydrocarbons (methane, ethane and propane), and inert gases such as nitrogen and carbon dioxide may be provided to the gas turbine combustor as fuel. In a preferred embodiment, substantially all of the fuel required by the gas turbine may be provided by this tail gas stream. The tail gas from the Fischer Tropsch reactor may contain significant amounts of nitrogen and therefore may have a very low btu content. The gas turbine combustor may be equipped with a catalytic combustion element or a trapped vortex combustion element as described in U.S. Pat. No. 8,549,862 or any other type of low btu combustor known to one skilled in the art.

Any excess fuel that cannot be burned in the gas turbine may be combusted with a duct burner in the gas turbine exhaust. If the tail gas btu content is less than required by the gas turbine, natural gas may be added to the tail gas to provide additional energy as required. The hot gas turbine exhaust may be used to preheat the combined oxygen containing stream and the feed hydrocarbon gas stream before going to the synthesis gas production unit. Optionally, burning excess tail gas in the gas turbine exhaust may make it possible to pre-heat the synthesis gas generation feed streams to a higher temperature, which may improve the efficiency of the synthesis gas generation unit. Ideally, the amount of light gaseous hydrocarbon that is used as feed gas may be at least enough so that the Fischer Tropsch tail gas energy content is adequate to meet the fuel requirement of the gas turbine.

The water produced in the Fischer Tropsch reactor may be used for oil field operation such as for water flood or fracking. If there is not a use for the water, it may optionally be put into the exhaust of the gas turbine and vaporized. In this case, it may be desirable to first strip any organics such as alcohols and acids out of the water. Feed gas may optionally be used to strip the organics out of the water. These organic alcohols and acids may be collected and sold as a product or recycled as additional feed to the synthesis generation unit.

In a preferred embodiment, the gas turbine may produce power and the power produced may be adequate to drive the air compression, air separation, oxygen rich gas compression, and all additional power requirements for the entire process. Additional requirements for power may include, but are not limited to, pumps, air coolers, lighting, and controls.

The process of the present invention may comprise the following steps:

A compressed air stream may be extracted from the compressor section of a gas turbine;

An oxygen rich stream may be produced by separating ambient air in an air separation unit;

The oxygen rich stream may be compressed to an elevated pressure for introduction into a synthesis gas generation unit. If the synthesis gas generation unit is operated at a pressure higher than the pressure of the compressed air stream extracted from the gas turbine, it may be further compressed to the pressure required by the synthesis gas generation unit;

A light hydrocarbon gas stream may be compressed to the pressure required by the synthesis gas generation unit;

The combined air and oxygen rich stream comprising between 25% and 50% oxygen (by volume) may be mixed and pre-heated to between 400 and 1,100 F by exchange with the gas turbine exhaust;

The light gaseous hydrocarbon stream may be pre-heated to between 400 and 1,100 F by exchange with the gas turbine exhaust;

The combined, pre-heated oxygen stream and light hydrocarbon stream may be reacted with optional addition of steam in the synthesis gas generation unit to make synthesis gas comprising carbon monoxide and hydrogen at the desired H2:CO ratio;

The synthesis gas may be reacted to produce products such as methanol, higher alcohols, or heavy hydrocarbon products; and Water, hydrocarbon products, and light un-reacted gases and non-condensable hydrocarbon gases may be separated. The gases may be provided as fuel to the combustor of the gas turbine. If the fuel gases are at a pressure lower than required to get into the combustor of the gas turbine, they may be compressed to a level required by the gas turbine.

As described herein, use may be made of pre-packaged equipment such as a gas turbine, air compressor, air separation unit, oxygen compressor, and natural gas compressor, especially a gas turbine to efficiently integrate the components of a gas to liquids process. The gas turbine may provide part of the air and air compression requirements, consumption and utilization of a low btu residue gas, power to operate the air separation unit and to operate all compression and other components of the process, energy to preheat the feed gas and oxygen sources, and disposal of produced water. Gas turbines may be available in a large range of configurations and sizes that can be used to integrate the process of the present invention.

The process configuration in FIG. 1 describes a preferred embodiment of the present invention. A gaseous hydrocarbon feedstock 1 such as natural gas, associated gas, coal seam gas, landfill gas or biogas may be compressed in a compressor 2 to a pressure required by a synthesis gas generation unit 33, which may comprise a POX reactor 20 and an autothermal reformer 22. The compressed natural gas feed stream 3 may optionally be combined with steam 37, which may reduce the potential for soot formation and may provide adjustment to the H2:CO ratio, and then may be pre-heated in a coil 4 within a gas turbine exhaust duct 32. The pre-heated gaseous hydrocarbon 17 may be mixed with an oxygen containing stream 18 at the inlet of the POX reactor 20.

Compressed air 13 from a compressor 10 of a gas turbine unit 9 may be split into combustion air 14 and extraction air 15. The extracted portion of the air 15 may be blended with an oxygen rich stream 8, which may be produced from ambient air 5 that is separated in an air separation unit 6 and compressed in an oxygen compressor 7. The combined oxygen streams may be pre-heated in a coil 16 in the gas turbine exhaust duct 32 and split into stream 18, which may be mixed with the entire pre-heated gaseous hydrocarbon stream 17 and fed to the POX reactor 20, and stream 19, which may be combined with the outlet of the POX reactor 20.

The partially oxidized feed stream mixed with additional oxygen 21 may be transferred to the autothermal reformer 22. Hot synthesis gas 23 may exit the ATR 22 and may be quench cooled in a waste heat boiler 24. Synthesis gas 25 may be further cooled in an air cooler 26 and transferred to a Fischer Tropsch reactor system 28 via line 27, where carbon monoxide and hydrogen in the synthesis gas 23 may be reacted and separated into products, which may include water 30, heavy hydrocarbons 29, and gases 31.

The tail gas stream 31, which may contain inert gases such as nitrogen and carbon dioxide and combustible gases such as hydrogen, carbon monoxide, methane, ethane, and propane, may be compressed in a compressor 35 and transferred via line 36 to be combusted in the gas turbine combustor 11. Hot combustion gases from combustor 11 may be expanded through an expansion turbine 12, generating energy to drive compressor 10 and additional energy, which may drive a power generator 34. The power generator 34 may be used to drive process compressors, such as compressor 2, compressor 7, and compressor 35; the air separation unit 6; and/or additional equipment as needed in the process.

Whereas the devices and methods have been described in relation to the drawings and claims, it should be understood that other and further modifications, apart from those shown or suggested herein, may be made within the spirit and scope of this invention.

What is claimed is:

1. A process for converting a light hydrocarbon gas feed stream into heavy hydrocarbon products, which process comprises:
   A) extracting compressed air from a compressor section of a gas turbine;
   B) separating ambient air into an oxygen-rich stream and a nitrogen-rich stream;
   C) compressing and combining the oxygen-rich stream with the compressed air extracted from the compressor section of the gas turbine to produce a combined oxygen stream, such that the combined oxygen stream comprises between 25% and 50% by volume oxygen;
   D) pre-heating the combined oxygen stream to between 400 F and 1,100 F by exchange with exhaust gases from the gas turbine to produce a pre-heated combined oxygen stream;
   E) providing the light hydrocarbon gas feed stream at a pressure substantially equivalent to the pressure of the pre-heated combined oxygen stream, where the light hydrocarbon gas feed stream is preheated to between 400 F and 1,100 F by exchange with exhaust gases from the gas turbine;
   F) converting the pre-heated combined oxygen stream and the light hydrocarbon gas feed stream to synthesis gas in a synthesis gas generation unit;
   G) converting the synthesis gas of step F to hydrocarbon products in a synthesis reactor;
   H) condensing and separating the hydrocarbon products of step G; and
   I) using tail gas from the synthesis reactor as fuel in a combustor of the gas turbine.

2. The process of claim 1 wherein the light hydrocarbon gas feed stream comprises natural gas, associated gas, coal seam gas, landfill gas, biogas, or a combination thereof.

3. The process of claim 1 wherein the hydrocarbon products comprise methanol, higher alcohols, Fischer Tropsch products, or a combination thereof.

4. The process of claim 1 wherein separating ambient air of step B is accomplished by membrane separation, pressure swing adsorption, vacuum pressure swing adsorption, or cryogenic liquefaction and separation.

5. The process of claim 1 wherein the compressed air and the oxygen-rich stream are compressed in step C to a pressure high enough that, after pressure losses through the synthesis gas generation unit and the synthesis reactor, the tail gas has a pressure high enough to flow into the combustor section of the gas turbine.

6. The process of claim 5 wherein the compressed air and the oxygen-rich stream are compressed separately or together in a single compressor.

7. The process of claim 1 wherein the synthesis gas generation unit is operated at a pressure below the pressure of air extraction from the compressor section of the gas turbine and the tail gas is compressed to a pressure required to flow into the combustor of the gas turbine.

8. The process of claim 1 wherein the synthesis gas generation unit comprises a partial oxidation reactor, an autothermal reformer reactor, or a combination thereof.

9. The process of claim 8 wherein the partial oxidation reactor is catalytic or non-catalytic.

10. The process of claim 1 wherein the gas turbine drives a power generator.

11. The process of claim 10 wherein the power generator provides substantially all of the power required to drive the process.

12. The process of claim 1 wherein the tail gas provides substantially all energy required to drive the gas turbine.

13. The process of claim 1 wherein the gas turbine uses a catalytic element or a trapped vortex element in the combustor to burn a low btu tail gas.

14. The process of claim 1 wherein any excess tail gas above what is required to operate the gas turbine is combusted in a duct burner in an exhaust of the gas turbine.

15. The process of claim 1 further comprising adding a small amount of supplemental fuel to the tail gas if the tail gas is not adequate to operate the gas turbine at full power.

16. The process of claim 1 wherein the synthesis reactor produces synthesized water, the process further comprising using the synthesized water for water flood or fracking purposes or vaporizing the synthesized water in an exhaust of the gas turbine.

17. The process of claim 16 further comprising stripping the synthesized water to remove trace organics such as alcohols and organic acids before vaporizing the synthesized water in the exhaust of the gas turbine.

18. The process of claim 17 wherein light hydrocarbon feed gas is used to strip trace organics from the synthesized water.

19. The process of claim 1 further comprising:
   pre-heating a feed stream to a hydroprocessing unit by exchange with an exhaust of the gas turbine, the feed stream comprising the hydrocarbon products; and
   further hydroprocessing the heavy products.

* * * * *